United States Patent [19]

Budzelaar et al.

[11] Patent Number: 5,175,244
[45] Date of Patent: Dec. 29, 1992

[54] POLYMERIZATION OF CO/OLEFIN WITH DIPHOSPHINE CONTAINING HETEROCYCLIC/ALKYL SUBSTITUENTS

[75] Inventors: Petrus H. M. Budzelaar; Eit Drent, both of Amsterdam, Netherlands

[73] Assignee: Shell Oil Company, Houston, Tex.

[21] Appl. No.: 697,554

[22] Filed: May 9, 1991

[30] Foreign Application Priority Data

May 29, 1990 [NL] Netherlands .......................... 9001229

[51] Int. Cl.$^5$ .............................................. C08G 67/02
[52] U.S. Cl. .................... 528/392; 502/162; 546/348; 568/8
[58] Field of Search ......................................... 528/392

[56] References Cited

U.S. PATENT DOCUMENTS

| | | | |
|---|---|---|---|
| 3,694,412 | 9/1972 | Nozaki | 260/63 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,902 | 11/1989 | Van Doorn et al. | 528/392 |
| 4,880,903 | 11/1989 | Van Broekhoven et al. | 528/392 |
| 4,960,747 | 10/1990 | Van Doorn et al. | 502/167 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 305012 | 3/1989 | European Pat. Off. . |

Primary Examiner—Harold D. Anderson

[57] ABSTRACT

An improved process for the production of linear alternating polymers of carbon monoxide and at least one ethylenically unsaturated hydrocarbon employs a novel catalyst composition formed from a compound of palladium, the anion of a strong non-hydrohalogenic acid and a novel bidentate phosphine ligand wherein each phosphorus has an aliphatic group as one monovalent substituent and as another monovalent substituent a heteroaromatic group connected to the phosphorus by a ring carbon atom. The polymers are useful as thermoplastics.

14 Claims, No Drawings

POLYMERIZATION OF CO/OLEFIN WITH DIPHOSPHINE CONTAINING HETEROCYCLIC/ALKYL SUBSTITUENTS

FIELD OF THE INVENTION

This invention relates to an improved process for the production of linear alternating polymers of carbon monoxide and at least one ethylenically unsaturated hydrocarbon. More particularly, the invention relates to such a polymerization process employing a novel catalyst composition formed from, inter alia, a novel bidentate phosphine ligand.

BACKGROUND OF THE INVENTION

The class of linear alternating polymers of carbon monoxide and at least one ethylenically unsaturated hydrocarbon has been known for some time. Nozaki, e.g., U.S. Pat. No. 3,694,412, produced such polymers in the presence of arylphosphine complexes of palladium moieties and certain inert solvents. More recently, the production of the linear alternating polymers, now known as polyketones or polyketone polymers, is illustrated by a number of published European Patent Applications including Nos. 121,965, 181,014, 213,671 and 257,663. The processes involve the use of a catalyst composition formed from a compound of palladium, cobalt or nickel, the anion of a strong non-hydrohalogenic acid and a bidentate ligand of phosphorus, arsenic, antimony or nitrogen. Although the scope of the polymerization process is extensive, and without wishing to be limited, a preferred catalyst composition is formed from a compound of palladium, the anion of a non-hydrohalogenic acid having a pKa below 2 and a bidentate ligand of phosphorus.

Although the choice of each catalyst composition precursor has an important effect upon the nature of the catalyst composition, the choice of ligand seems to be particularly important. The relevant above published applications illustrate the use of tetraalkyl diphosphines or tetraaryl diphosphines wherein the aryl groups are hydrocarbon or are substituted hydrocarbon where a substituent group is polar, particularly alkoxy. In the disclosure of published European Patent Application EP 305012, good results are obtained when the diphosphine ligand from which the catalyst composition is of the general formula (XX'P)$_2$Y wherein X is an aromatic group, X' is a heteroaromatic group and Y is a divalent linking group. It would be of advantage, however, to provide additional bidentate phosphine ligands which give even better results when employed as part of a catalyst composition used to catalyze the production of linear alternating polymers of carbon monoxide and at least one ethylenically unsaturated hydrocarbon.

SUMMARY OF THE INVENTION

The present invention provides an improved process for the production of linear alternating polymers of carbon monoxide and at least one ethylenically unsaturated hydrocarbon. More particularly, the invention provides such a polymerization process which employs a novel catalyst composition formed in part from a novel bidentate ligand of phosphorus wherein each phosphorus is substituted by one monovalent aliphatic substituent and also by a monovalent heteroaromatic substituent connected to the phosphorus by a ring carbon atom.

DESCRIPTION OF THE INVENTION

The process of the invention comprises an improved process for the production of linear alternating polymers of carbon monoxide and at least one ethylenically unsaturated hydrocarbon. The ethylenically unsaturated hydrocarbon useful as precursors of the polyketone polymers have up to 20 carbon atoms inclusive, preferably up to 10 carbon atoms inclusive, and are aliphatic such as ethylene or other α-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred copolymers produced according to the process of the invention are copolymers of carbon monoxide and ethylene and the preferred terpolymers are terpolymers of carbon monoxide, ethylene and a second ethylenically unsaturated hydrocarbon of at least 3 carbon atoms, particularly an α-olefin such as propylene.

When the preferred terpolymers are produced by the process of the invention, there will be at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

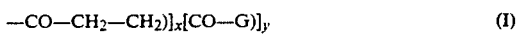

$$-CO-CH_2-CH_2)]_x[CO-G)]_y \qquad (I)$$

wherein G is the moiety of an ethylenically unsaturated hydrocarbon of at least 3 carbon atoms polymerized through the ethylenic unsaturation thereof and the ratio of y:x is no more than about 0.5. When the preferred copolymers are produced there will be no second hydrocarbon present and the copolymers are represented by the above formula I wherein y is zero. When y is other than zero, i.e., terpolymers are produced, the —CO—CH$_2$—CH$_2$— units and the —CO(G— units are found randomly throughout the polymer chain and the preferred ratios of y:x are from about 0.01 to about 0.1. The end groups or "caps" of the polymer chain will depend upon what materials are present during polymerization and whether and how the polymer has been purified. The precise nature of the end groups is of little significance so far as the overall properties of the polymer are concerned so that the polymer is fairly represented by the formula for the polymer chain as depicted above.

Of particular interest are the polymers of number average molecular weight from about 1000 to about 200,000, particularly those of number average molecular weight from about 20,000 to about 90,000, as determined by gel permeation chromatography. The properties of the polymers will depend in part upon the molecular weight, whether the polymer is a copolymer or a terpolymer and, in the case of terpolymers, the nature of and the proportion of the second hydrocarbon present. Typical polyketone polymers have a melting point from about 175° C. to about 300° C. although melting points from about 210° C. to about 270° C. are more frequently encountered. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polyketone polymers are produced according to the general procedure of the above published European Patent Applications in the presence of a catalyst composition formed from a compound of palladium, the anion of a non-hydrohalogenic acid having a pKa below 2 and a novel bidentate phosphorus ligand of the invention. The palladium compound is a palladium carboxylate, particularly a palladium alkanoate, and palladium acetate, palladium propionate, palladium butyrate and palladium hexanoate are satisfactory. Particularly preferred as the compound of palladium is palladium acetate. The non-hydrohalogenic acids of pKa below 2 which provide anions suitable as catalyst composition precursors include inorganic acids such as sulfuric acid or perchloric acid and organic acids such as carboxylic acids, e.g., trichloroacetic acid, dichloroacetic acid, trifluoroacetic acid and difluoroacetic acid, or such as sulfonic acids, e.g., methanesulfonic acid, trichloromethanesulfonic acid and p-toluene sulfonic acid. The acids whose anions are preferred as catalyst composition components are trifluoroacetic acid and p-toluenesulfonic acid. The anion is preferably provided as the acid but alternatively is provided as a metal salt, particularly as a non-noble transition metal salt. However provided, the quantity of anion to be employed is from about 1 mole to about 100 moles per mole of palladium. The preferred quantities of anion are from about 2 moles to about 50 moles per mole of palladium.

The bidentate phosphine ligand comprises two phosphorus atoms linked by an aliphatic group of up to 10 carbon atoms inclusive and wherein each phosphorus atom has as one monovalent substituent an aliphatic substituent and as the other monovalent substituent a heterocyclic aromatic group, i.e., a heteroaromatic group, linked through a ring carbon thereof to the phosphorus. Preferred bidentate phosphorus ligands of the invention are represented by the formula

(II)

wherein R independently is alkyl of up to 6 carbon atoms inclusive, R' independently is a heteroaromatic group of up to 10 carbon atoms with from 5 to 6 atoms in the ring, which ring contains at least one atom selected from nitrogen, oxygen or sulfur. The preferred R' groups contain up to 10 carbon atoms inclusive and from 4 to 5 carbon atoms in the ring and one heteroatom selected from nitrogen or sulfur. Illustrative of such R' groups are 2-pyridyl, 4-pyridyl, 2-furyl and 2-thiemyl. Particularly preferred as the R' group is 2-pyridyl. The R" group is a divalent aliphatic linking group of up to 6 carbon atoms with from 2 to 4 carbon atoms inclusive in the bridge linking the two phosphorus atoms. Suitable R" groups include 1,2-ethylene, 1,2-propylene, 1,3-propylene and 1,3-butylene. Preferred as the R" group is 1,3-propylene and particularly preferred as the bidentate phosphine ligand of the invention is 1,3-di[(2-pyridyl)n-butylphosphino]propane.

The bidentate phosphine ligands of the above formula II are novel compounds but are prepared by known methods. For example, a monophosphine containing one aromatic, e.g., phenyl, and two heteroaromatic groups is reacted with an alkali metal alkyl and the resulting phosphide is reacted with an alkyl dihalide. By way of specific example, di(2-pyridyl)phenylphosphine is reacted with n-butyllithium and the resulting product is reacted with 1,3-dibromopropane to produce 1,3-di[(2-pyridyl)n-butylphosphino]propane. The quantity of the bidentate phosphine ligand to be employed in the formation of the catalyst composition is suitably from about 0.5 mol to about 2 mols per mol of palladium. Preferred quantities of the phosphine ligand are from about 0.75 mole to about 1.5 mole per mole of palladium.

The carbon monoxide and the ethylenically unsaturated hydrocarbon monomers are contacted under polymerization conditions in a suitable reactor in the presence of a reaction diluent and a catalytic quantity of the catalyst composition. The molar ratio of carbon monoxide to total ethylenically unsaturated hydrocarbon is from about 10:1 to about 1:10 but preferably from about 5:1 to about 1:5. The reaction diluent is suitably a lower alkanol such as methanol or ethanol or a lower alkanone such as acetone or methyl ethyl ketone. Methanol is the preferred reaction diluent. The catalyst composition is formed by mixing the precursors thereof which is suitably accomplished before introduction into the reactor or alternatively the catalyst composition is produced in situ in the polymerization reactor. The quantity of catalyst composition to be used is sufficient to provide from about $1 \times 10^{-7}$ mole to about $1 \times 10^{-3}$ mole of palladium per mole of total unsaturated hydrocarbon. Preferred quantities of catalyst composition will provide from about $1 \times 10^{-6}$ mole to about $1 \times 10^{-4}$ mole of palladium per mole of total unsaturated hydrocarbon. Typical polymerization conditions include a reaction temperature from about 25° C. to about 150° C., preferably from about 30° C. to about 130° C. The reaction pressure is suitably from about 2 bar to about 150 bar although pressures from about 5 bar to about 100 bar are more frequently employed. During reaction the reactant/catalyst composition contact is promoted by some means of agitation such as shaking or stirring. Subsequent to polymerization, the reaction is terminated as by cooling the reactor and contents and releasing the pressure. The polymer product is typically encountered as a suspension in the reaction diluent from which it is recovered by conventional techniques such as filtration or centrifugation. The polymer is used as obtained or alternatively is purified if desired by treatment with a solvent or complexing agent selective for catalyst residues.

The polyketone polymer product is a thermoplastic material of established utility. It is processed by methods conventional for thermoplastic polymers, e.g., injection molding, extrusion and thermoforming, into a variety of useful shaped articles. Specific applications include the production of containers for food and drink and the production of parts and housings for automotive applications.

The invention is further illustrated by the following Comparative Example (not of the invention) and the Illustrative Embodiments which should not be regarded as limiting. In the Comparative Example and Illustrative Embodiment II the copolymers produced were found by NMR analysis to be linear alternating copolymers of carbon monoxide and ethylene.

COMPARATIVE EXAMPLE

A copolymer of carbon monoxide and ethylene was produced by charging to an autoclave of 250 ml capacity equipped with a mechanical stirrer a catalyst solution comprising 50 ml methanol, 0.1 mmol palladium acetate, 0.5 mmol p-toluenesulfonic acid and 0.12 mmol 1,3-di[(2-pyridyl)phenylphosphino]propane. Ethylene was introduced to give a pressure of 20 bar and carbon monoxide was added to give a total pressure of 50 bar and the autoclave and contents were heated to 50° C. After 5 hours the polymerization was terminated by cooling the autoclave and contents to room temperature and releasing the pressure. The copolymer product was recovered by filtration, washed with methanol and dried. The yield of copolymer was 1.5 g, produced at a rate of 30 g of copolymer/g Pd. hr.

ILLUSTRATIVE EMBODIMENT I

The compound 1,3-di[(2-pyridyl)n-butylphosphino]propane was produced by adding 5.9 ml of a 1.6 molar solution of n-butyllithium in n-hexane to a solution of 2.4 g di(2-pyridyl)phenylphosphine in 20 ml of tetrahydrofuran cooled to −80° C. over a 10 minute period while the mixture was stirred. After the temperature of the mixture had risen to room temperature it was cooled to −40° C. and a solution of 0.96 g 1,3-dibromopropane in 10 ml tetrahydrofuran was added while stirring continued. After the temperature of the mixture had again risen to room temperature, the solvents were removed under reduced pressure. To the resulting mixture were added 25 ml of diethyl ether and 10 ml of water. The mixture was stirred for 10 minutes and the organic layer was removed and the aqueous layer extracted with 10 ml of diethyl ether. The organic layers were combined and the solvent removed under reduced pressure. An NMR analysis of the residue indicated that it was a 1:2 molar mixture of 1,3-di[(2-pyridyl)n-butylphosphino]propane and 2-phenylpyridine. From this mixture, the 1,3-di[(2-pyridyl)n-butylphosphino]propane was separated by distillation.

ILLUSTRATIVE EMBODIMENT II

A carbon monoxide/ethylene copolymer was produced by a process substantially similar to that of the Comparative Example except that 1,3-di[(2-pyridyl)n-butylphosphino]propane was used instead of 1,3-di[(2-pyridyl)phenylphosphino]propane and the reaction time was 1 hour instead of 5 hours. The yield of copolymer was 3 g, produced at a rate of 300 g of copolymer/g Pd hr.

What is claimed is:

1. In the process of producing a linear alternating polymer of carbon monoxide and at least one ethylenically unsaturated hydrocarbon by contacting the carbon monoxide and hydrocarbon under polymerization conditions in the presence of a reaction diluent and a catalyst composition formed from a compound of palladium, the anion of a strong non-hydrohalogenic acid and a bidentate ligand of phosphorus, the improvement wherein the bidentate ligand is represented by the formula

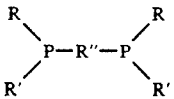

wherein R independently is an alkyl group of 4 carbon atoms inclusive, R' independently is a heteroaromatic group containing up to 10 carbon atoms inclusive with from 4 to 5 carbon atoms in the ring and one heteroatom selected from nitrogen or sulfur in the ring, and R" is a divalent aliphatic group of from 2 to 4 carbon atoms in the bridge linking the two phosphorus atoms.

2. The process of claim 1 wherein R" is 1,3-propylene.

3. The process of claim 2 wherein R' is 2-pyridyl, 4-pyridyl, 2-furyl or 2-thienyl.

4. The process of claim 2 wherein R is n-butyl.

5. The process of claim 4 wherein R' is 2-pyridyl.

6. In the process of producing linear alternating polymer of carbon monoxide and ethylene by contacting carbon monoxide and ethylene under polymerization conditions in the presence of a methanol reaction diluent and a catalyst composition formed from palladium acetate, the anion of trifluoroacetic acid or p-toluenesulfonic acid and a bidentate phosphine ligand, the improvement wherein the phosphine ligand is represented by the formula

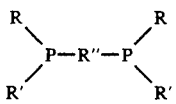

wherein R independently is alkyl group of 4 carbon atoms, R' independently is a heteroaromatic group containing up to 10 carbon atoms inclusive with from 4 to 5 carbon atoms in the ring and one heteroatom in the ring selected from nitrogen or sulfur, and R" is 1,3-propylene.

7. The process of claim 6 wherein R' is 2-pyridyl, 4-pyridyl, 2-furyl or 2-thienyl.

8. The process of claim 6 wherein R is n-butyl.

9. The process of claim 6 wherein R' is 2-pyridyl.

10. In the process of producing a linear alternating terpolymer of carbon monoxide, ethylene, and propylene by contacting the carbon monoxide and hydrocarbons under polymerization conditions in the presence of a reaction diluent and a catalyst composition formed from a compound of palladium, the anion of a strong non-hydrohalogenic acid and a bidentate ligand of phosphorus, the improvement wherein the bidentate ligand is represented by the formula

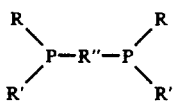

wherein R independently is an alkyl group of 4 carbon atoms inclusive, R' independently is a heteroaromatic group containing up to 10 carbon atoms inclusive with from 4 to 5 carbon atoms in the ring and one heteroatom selected from nitrogen or sulfur in the ring, and R" is a divalent aliphatic group of from 2 to 4 carbon atoms in the bridge linking the two phosphorus atoms.

11. The process of claim 10 wherein R" is 1,3-propylene.

12. The process of claim 11 wherein R is n-butyl.

13. The process of claim 12 wherein R' is 2-pyridyl, 4-pyridyl, 2-furyl or 2-thienyl.

14. The process of claim 13 wherein R' is 2-pyridyl.

* * * * *